Feb. 9, 1932.                F. W. GAY                1,843,922

ADJUSTABLE SPEED ELECTRIC MOTOR DRIVE

Filed Dec. 17, 1929

INVENTOR.
Frazer W. Gay
BY
George D. Richards
ATTORNEY.

Patented Feb. 9, 1932

1,843,922

UNITED STATES PATENT OFFICE

FRAZER W. GAY, OF NEWARK, NEW JERSEY

ADJUSTABLE SPEED ELECTRIC MOTOR DRIVE

Application filed December 17, 1929. Serial No. 414,656.

This invention relates, generally, to variable speed electric motor drives, and the invention has reference, more particularly, to a novel adjustable speed electric motor combination for driving either a fixed or variable load at variable speed.

Heretofore, in order to obtain adjustable speed drives it has been common practice either to employ motors operating on a direct current supply such as by using a motor-generator set and connecting adjustable speed motor devices to the direct current end of the set, or to employ alternating current commutator motors and obtain adjustable speeds by shifting brushes. Such motor drives have proven very expensive in use owing either to the large capital expense involved as in the case of the motor-generator set or to the high maintenance costs involved in using commutator A. C. motors, the latter drives also proving undesirable because of being unreliable.

The principal object of the present invention is to provide a novel adjustable speed motor drive that is reasonable in first cost, which is easily operated, very reliable in use and employs only well known equipment; and to this end use is made of a plurality of series A. C. motors mounted on a common shaft with the rotor of a wound rotor induction motor, each of the series motors being supplied from a phase of the wound rotor of the induction motor and being in series with the secondary winding of a variable ratio electric power transformer means which may take the form of an induction regulator, said power transformer means serving to step up or down the voltage of the current supplied to the series motors by the induction motor rotor.

Other objects of the invention, not at this time more particularly enumerated, will be clearly understood from the following detailed description of the same.

The invention is clearly illustrated in the accompanying drawings, in which:—

Similar characters of reference are employed in all of the hereinabove described views, to indicate corresponding parts.

Figure 1:
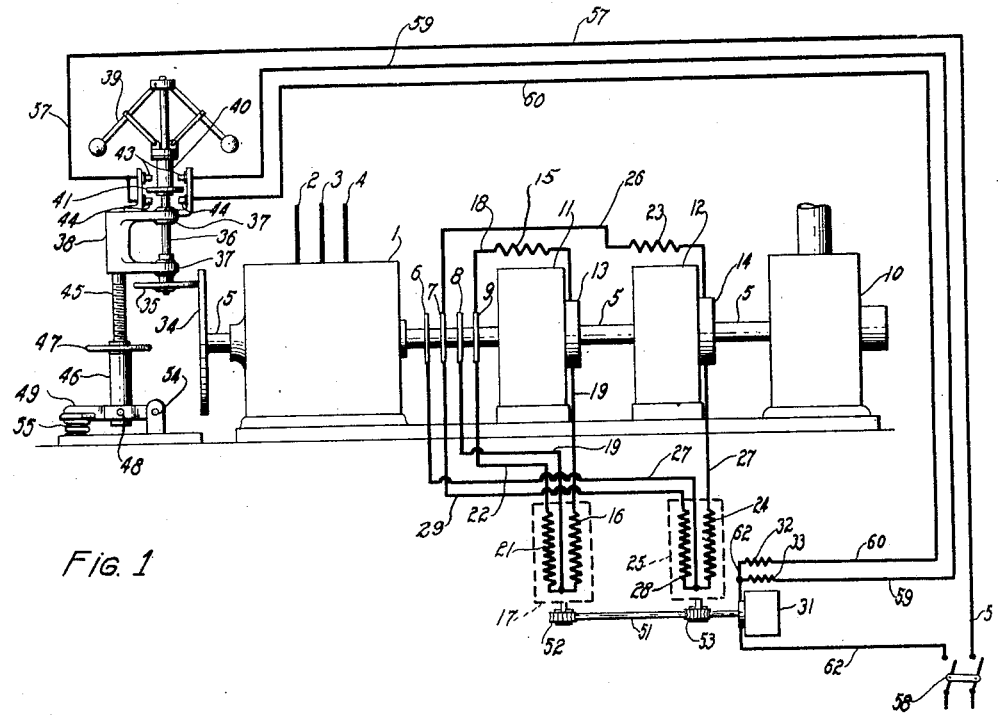
Fig. 1 is a diagrammatic representation of one form of the invention.

Referring now to Fig. 1 of the said drawings, the reference numeral 1 designates a wound rotor induction motor having its stator wound three phase and connected to the three phase supply leads 2, 3 and 4. The rotor of induction motor 1 is wound two phase and is mounted on a shaft 5. The terminals of one phase winding of the rotor of motor 1 are connected to slip rings 6 and 7, whereas the terminals of the other phase winding of this rotor are connected to slip rings 8 and 9.

Two series A. C. motors 11 and 12 are arranged in tandem with the induction motor 1, i. e. the armatures 13 and 14, of motors 11 and 12 respectively, are mounted on the shaft 5 carrying the rotor of induction motor 1. Motors 1, 11 and 12 are coupled in driving relation to a common load, illustrated as a blower 10. The armature 13 and field winding 15 of series motor 11 are connected in series with the secondary buck and boost winding 16 of a variable ratio transformer having the form of an induction regulator 17. Leads 18 and 19 connect field winding 15, armature 13 and secondary winding 16 across slip rings 8 and 9. The primary winding 21 of the induction regulator 17 is connected in shunt across slip rings 8 and 9 by leads 19 and 22. The armature 14 and field winding 23 of series motor 12 are connected in series with the secondary buck and boost winding 24 of an induction regulator 25. Leads 26 and 27 connect field winding 23, armature 14 and secondary winding 24 across slip rings 6 and 7. The primary winding 28 of induction regulator 25 is connected in shunt across slip rings 6 and 7 by leads 27 and 29.

Induction regulators 17 and 25 act respectively to buck and boost the voltage supplied to series motors 11 and 12 from the rotor of motor 1 and these regulators are operated jointly by a D. C. series motor 31 having oppositely wound field windings 32 and 33. Motor 31 drives a shaft 51 having worms thereon in operative driving relation to the worm wheels 52 and 53 of induction regulators 17 and 25 respectively.

The free end of shaft 5 adjacent motor 1 carries a disk 34 which revolves with this shaft. A friction wheel 35 has its periphery frictionally engaging the disk 34 to be driven by the latter. Friction wheel 35 is secured to a shaft 36 extending at right angles to shaft 5 and rotatably supported in bearings 37 provided in a frame 38. A flyball governor 39 is carried by shaft 36 and is adapted to raise and lower a sleeve 40 mounted on shaft 36. A conducting ring 41 is insulated from and carried by sleeve 40. Conductor ring 41 is adapted to engage a pair of contacts 43 when the speed of shaft 36 increases to a predetermined value and this conducting ring is adapted to engage a pair of contacts 44 when the speed shaft 36 decreases from such value to a predetermined lower value.

Frame 38 is carried by an upright threaded shaft 45 which is vertically movable within a sleeve 46. A hand wheel 47 rests upon the upper end of sleeve 46 and has a threaded aperture through which the shaft 45 extends. By turning hand wheel 47 the frame 36 and hence friction wheel 35 may be raised or lowered, thereby moving this friction wheel crosswise of disk 34 and varying the speed ratio between shafts 5 and 36. Sleeve 46 is fixedly secured at 48 upon a lever 49 which is fulcrumed at 54. A compression spring 55 engages the free end of lever 49 and urges friction wheel 35 into engagement with disk 34.

One of the contacts 43 and one of the contacts 44 are connected by a lead 57 to one pole of a double pole switch 58. The remaining contact 43 is connected by a lead 59 to one side of field winding 33 and the remaining contact 44 is connected by a lead 60 to one side of field winding 32. The other sides of these field windings are connected by a lead 62 through the armature of motor 31 to the other pole of switch 58. Switch 58 is connected to a suitable source of direct current supply.

In operaton, current supplied from the rotor of induction motor 1 through slip rings 6 to 9 operates the series motors 11 and 12 which assist the induction motor 1 in driving the load 10. The speed at which the load or blower 10 is driven may be controlled at will by adjusting the hand wheel 47. For example, if the hand wheel 47 is adjusted so as to cause the friction wheel 35 to move upwardly or radially outwardly of the disk 34, then the speed ratio between shafts 5 and 36 is increased so that shaft 36 increases in speed, causing the flyball governor 39 to operate to raise conducting ring 41 from an intermediate normal inoperative position between pairs of contacts 43 and 44 to a higher position where it engages contacts 43. Upon the engagement of contacts 43 by conducting ring 41, a circuit is established from one pole of switch 58 (switch 58 is closed during the operation of the motor drive) by way of lead 57, contacts 43 and conducting ring 41, through lead 59, field winding 33, the armature of motor 31 and lead 62 to the other pole of switch 58. Motor 31 is thus energized to drive shaft 51 in a reverse direction to effect the turning of secondary buck and boost windings 16 and 24 so as to buck the voltage impressed on series motors 11 and 12, thereby causing these motors to slow up. As the speed of the load 10 and hence of motor 1 slows up, that of the governor 39 also slows up until a speed is reached at which conducting ring 41 disengages contacts 43, causing motor 31 to come to rest. The motor drive 1, 11 and 12 then continues to operate at the speed obtaining when ring 41 disengaged contacts 43.

On the other hand, if the hand wheel 47 is adjusted so as to cause the friction wheel 35 to move downwardly or radially inwardly of the disk 34, then the speed ratio between shafts 5 and 36 is decreased so that shaft 36 decreases in speed, causing the flyball governor to operate to lower conducting ring 41 from its intermediate inoperative position to a lower position where it engages contacts 44. Upon the engagement of contacts 44 by conducting ring 41, a circuit is established by way of leads 57 and 60 for field winding 32 and the armature of motor 31, causing this motor to drive shaft 51 in a forward direction to effect the turning of secondary windings 16 and 24 so as to boost the voltage impressed on series motors 11 and 12, thereby causing these motors to speed up, resulting in the driving of load 10 at a higher speed.

Thus it is seen that the speed at which the load 10 is driven depends entirely upon the relative position of friction wheel 35 on disk 34. If during the operation of the motor drive, the load 10 should increase causing the speed of the motor drive to decrease, then flyball governor 39 will operate to cause conducting ring 41 to engage contacts 44 resulting in the operation of motor 31 to boost the voltage on the motors 11 and 12 effecting the return of the motor drive to its former higher speed. Thus, the speed of the motor drive is maintained at any desired value depending upon the adjustment of hand wheel 47, and is independent of variations in the load 10.

In the event that the novel motor drive of this invention is to be used with a substantially constant load such as a fan, then the governor 39 and its associated apparatus may be omitted in which event the induction regulators 17 and 25 may be manually operated as by using a hand wheel on shaft 51.

Figure 2:
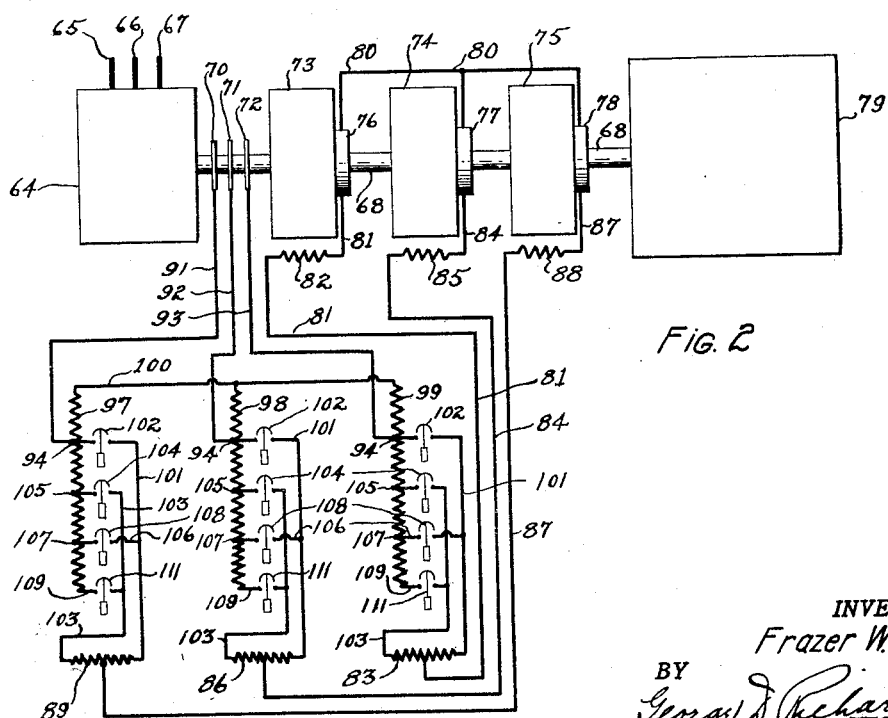
Fig. 2 is a view similar to Fig. 1 of a slightly modified form of the invention.

Fig. 2 illustrates the novel electric motor drive of this invention employed for driving a heavy variable load such as a steel mill drive. In this figure, the wound rotor induction motor 64 has its stator supplied with current through leads 65, 66 and 67. The rotor of induction motor 64 is mounted on a shaft 68 and is wound three phase, the output leads of the phase windings of this rotor being connected to slip rings 70, 71 and 72.

Three A. C. series motors 73, 74 and 75 are arranged in tandem with induction motor 64 and have their armatures 76, 77 and 78 respectively mounted upon the shaft 68. Motor 64 together with series motors 73 to 75 are adapted to drive the load 79 which, for example, may be a rolling mill. Corresponding sides of the armatures 76, 77 and 78 are interconnected by a neutral jumper lead 80. The other side of armature 76 of series motor 73 is connected by a lead 81 through series field winding 82 to the mid-point of an auto-transformer 83. The other side of the armature 77 of series motor 74 is connected by a lead 84 through field winding 85 to the mid-point of an auto-transformer 86. Likewise the other side of armature 78 of series motor 75 is connected by a lead 87 through a series field winding 88 to the mid-point of an auto-transformer 89.

The slip rings 70, 71 and 72 are connected by leads 91, 92 and 93, respectively, to similarly positioned taps 94 of phase windings 97, 98 and 99 of a three phase variable ratio transformer. One end of each of the phase windings 97, 98 and 99 is connected to the corresponding ends of the others of these phase windings by a neutral connector 100. Taps 94 are illustrated as being quarter taps, or taps which are each located at one-quarter of the length of its respective phase winding from the neutral connector 100, but it is to be understood that these taps may be located elsewhere on their phase windings, depending upon the requirements of any particular installation.

Tap 94 of phase winding 97 is connected by a lead 101 through a circuit breaker 102 to one side of the auto-transformer 89. The other side of auto-transformer 89 is connected by a lead 103 through a circuit breaker 104 to a second tap 105 of the phase winding 97. Tap 105 is illustrated as a mid-tap in the drawings. A third tap 107 on the phase winding 97 is shown as positioned three-quarters of the length of the winding from connector 100 and is connected by a lead 106 through a circuit breaker 108 to lead 101. The end of phase winding 97 is connected by a lead 109 through a circuit breaker 111 to lead 103.

Similarly, phase windings 98 and 99 are provided with mid-taps 105 and three-quarter taps 107 and the several taps of these phase windings are connected in the same manner as the taps of winding 97 through circuit breakers to their respective auto-transformers 86 and 83. Similar taps of these phase windings and their connected circuits are designated by like reference numerals in Fig. 2 of the drawings.

In operation, with the rolling mill 79 running and the circuit breakers 102 closed, current is supplied from the rotor of induction motor 64 through leads 91, 92 and 93 to the phase windings 97, 98 and 99 of the variable ratio transformer. From this transformer such current flows through leads 101, circuit breakers 102 and auto-transformers 83, 86 and 89 to the series motors 73, 74 and 75. With circuit breakers 102 alone closed the voltage impressed on these series motors is substantially the same as that across the slip rings 70, 71 and 72.

If the circuit breakers 104 are closed in addition to circuit breakers 102, then the mid-taps of auto-transformers 83, 86 and 89 will have a voltage that is midway between the voltages of taps 94 and 105, or in other words the voltage supplied to series motors 73 to 75 will be substantially one and one-half times the voltage across the slip rings 70 to 72. By opening the circuit breakers 102 while circuit breakers 104 remain closed, the voltage impressed on the series motors will be increased to two times that across slip rings 70 to 72. By successively closing circuit breakers 108, then opening circuit breakers 104, then closing circuit breakers 111 and finally opening circuit breakers 108, the voltages impressed on the series motors may be increased in successive steps from two and one-half, three, three and one-half to four times that across the slip rings 70 to 72.

The circuit breakers 102, 104, 108 and 11 may be operated manually or by a suitable load responsive means such as that disclosed in my copending application, Serial No. 409,781, filed Nov. 26, 1929 for auxiliary motor control system, wherein a wattmeter is used for completing consecutively arranged circuits as the load varies. Thus, under varying conditions of operation of the rolling mill 79, the series motors 73 to 75 are caused to deliver varying torques as required while utilizing the current delivered by the rotor of induction motor 64.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. An adjustable speed electric motor drive comprising, a wound rotor induction motor, a plurality of A. C. series motors connected to receive operating power from said induction motor rotor, a variable ratio transforming device connected intermediate said induction motor rotor and said series motors, and speed governor means arranged to control the operation of said transforming device, whereby the latter acts to retain the speed of said A. C. motors at a desired value.

2. An adjustable speed electric motor drive comprising, a wound rotor induction motor, a plurality of A. C. series motors connected to receive operating power from said induction motor rotor, a variable ratio transforming device connected intermediate said induction motor rotor and said series motors, speed governor means arranged to control the operation of said transforming device, whereby the latter acts to retain the speed of said A. C. motors at a desired value, and manually operable means for varying the setting of said speed governor as desired, thereby resulting in accordingly varying the operating speed of said A. C. motors.

In testimony, that I claim the invention set forth above I have hereunto set my hand this 14th day of December, 1929.

FRAZER W. GAY.